United States Patent [19]
Krier et al.

[11] Patent Number: 5,855,459
[45] Date of Patent: Jan. 5, 1999

[54] VOID FILLER AND LOAD RETAINER

[75] Inventors: Martin Krier; John R. Perazzo, both of Cincinnati, Ohio

[73] Assignee: Packaging Unlimited of NK, Inc., Covington, Ky.

[21] Appl. No.: 969,256

[22] Filed: Nov. 13, 1997

Related U.S. Application Data

[63] Continuation of Ser. No. 530,480, Sep. 19, 1995, abandoned.

[51] Int. Cl.⁶ ............................. B61D 45/00; B60P 7/16
[52] U.S. Cl. ......................... 410/155; 410/121; 410/122
[58] Field of Search ..................... 206/593, 594, 206/814; 229/117.05, 117.06, 117.03, 117.01, 117.04; 52/71; 108/165; 248/174; 428/121, 184, 12; 410/121, 122, 154, 155, 117

[56] References Cited

U.S. PATENT DOCUMENTS

| | | |
|---|---|---|
| 2,588,232 | 3/1952 | Grant ............................. 229/117.06 X |
| 2,645,405 | 7/1953 | Dorfman ............................ 229/117.06 |
| 2,957,668 | 10/1960 | Norquist et al. . |
| 3,010,638 | 11/1961 | Forrer ............................. 229/117.07 X |
| 3,079,876 | 3/1963 | Doane . |
| 3,079,877 | 3/1963 | Doane . |
| 3,421,451 | 1/1969 | Brucks . |
| 3,424,108 | 1/1969 | Vargen . |
| 3,464,367 | 9/1969 | Latter . |
| 3,534,691 | 10/1970 | Carlomagno, Jr. . |
| 3,593,671 | 7/1971 | Bramlett . |
| 3,618,535 | 11/1971 | Hess . |
| 3,854,426 | 12/1974 | Kinnune, Jr. . |
| 3,942,709 | 3/1976 | Gepfer . |
| 4,109,587 | 8/1978 | Jansen, Jr. . |
| 4,363,579 | 12/1982 | Rogers ..................................... 410/154 |
| 4,372,717 | 2/1983 | Sewell et al. ............................ 410/154 |
| 4,386,881 | 6/1983 | Liebel ..................................... 410/154 |
| 4,494,897 | 1/1985 | Rogers ..................................... 410/154 |
| 4,865,889 | 9/1989 | Boyse . |
| 5,132,156 | 7/1992 | Trassare, Jr. et al. . |
| 5,328,088 | 7/1994 | Louczak ......................... 229/117.01 X |
| 5,486,078 | 1/1996 | Wise et al. .............................. 410/155 |

Primary Examiner—Stephen T. Gordon
Attorney, Agent, or Firm—Wood, Herron & Evans, L.L.P.

[57] ABSTRACT

A load retainer for use in the void of a cargo container to resist shifting of the cargo in transit has a symmetrical load bearing surface to evenly distribute the force delivered by the cargo. In a first presently preferred embodiment, the load retainer comprises a pair of panels which are coupled together to form an H-shaped device. The panels remain parallel to each other in an expanded load retaining configuration, a collapsed storage configuration and all positions therebetween. A second presently preferred embodiment has a symmetric rectilinear network shaped configuration and includes locking tabs to releasably secure the device in that configuration and resist lateral forces in either direction.

9 Claims, 4 Drawing Sheets

VOID FILLER AND LOAD RETAINER

This application is a continuation, of application Ser. No. 08/530,480, filed Sep. 19, 1995 now abandoned.

BACKGROUND OF THE INVENTION

This invention relates to a load retainer for use in a void of a cargo container, and more particularly, to a load retainer which can be locked into an expanded, generally symmetric load retaining configuration and/or converted into a collapsed storage configuration.

Shipment of products typically occurs using conventional rectangular cargo containers such as a truck trailer, railroad box car, the hold of a cargo ship and the like. Very often the cargo container is not entirely filled with the products being shipped. Furthermore, the cargo or load must be secured within the cargo container to prevent it from shifting during transportation and possibly damaging either the cargo or the cargo container.

Various techniques have been previously used to secure the load within the cargo container. These techniques include strategically arranging or organizing the cargo to minimize its straps, or tie-downs or nailing and otherwise securing boards between the cargo and the container. However, methods such as these have proven to be minimally effective and cannot be relied upon when there is a relatively large void in the cargo container.

The need to fill large volumes or voids has become particularly important due to the increased use of oversized truck trailers, rail cars, or the like. Problems associated with shifting cargo or loads are especially acute when relatively dense products are shipped. The dense products meet the weight limits of the cargo container while only filling up a relatively small fraction of available space therein. The failure to properly position the load and secure it within the trailer can result in illegal axle weight conditions, poor handling of the tractor trailer, rail car, cargo ship or the like, as well as an increased likelihood for damage to the cargo or the cargo container.

One prior solution to these problems is disclosed in U.S. Pat. No. 5,132,156 which is directed to a void filler constructed of a pair of panels which are connected at a hinge along the upper edge of the panels to form an inverted V-shaped structure. A limiter is attached at or near the lower edges of the panels to limit movement of the lower edges away from one another when the panels are in use and in the inverted V-shaped configuration. The device disclosed in U.S. Pat. No. 5,132,156 is positioned in the void of a cargo container between a container bulkhead and a load so that the upper and lower edges of that device are aligned between the load and the bulkhead. Specifically, the lower portion of the load is juxtaposed to the wider base region of the inverted V-shaped void filler whereas the upper portion of the load confronts the narrow point or upper region of the inverted V-shaped device. As a result of its configuration, loading between the upper and lower portions of that void filler is unsymmetric and the force generated by the tendency for the cargo to shift is not evenly distributed on the void filler. In particular, the force delivered to the upper narrow portion of the inverted V-shaped void filler is carried by a very small cross-sectional area of the void filler; namely, the upper point region. This loading condition becomes even more problematic when it is realized that a large portion of the force delivered by the load is in the upper portion of the load because the cargo has a tendency to tilt or tip over.

Therefore, one shortcoming of the void filler disclosed in U.S. Pat. No. 5,132,156 is that the majority of the force generated by the load is applied to the narrow portion of the device. Further, as a result of the force applied to the narrow portion of the void filler, the tendency for the void filler to collapse, tear, rip or be damaged is increased. Specifically, the hinge along the upper edge of the inverted V-shaped void filler may be torn or the bottom edges of the panels could be forced outwardly thereby ripping or tearing the limiter or the panels themselves.

SUMMARY OF THE INVENTION

It has therefore been a primary objective of this invention to provide an improved load retainer for use in the void of a cargo container.

It has been a further objective of this invention that the force delivered by the cargo can be evenly distributed on the load retainer.

It has been a still further objective of this invention to provide such a load retainer which has sufficient strength and rigidity to withstand the force delivered by the load without being damaged or collapsing.

Yet another objective of this invention has been to provide such a load retainer which is lightweight so that it can be easily moved and can be easily transformed from a load retaining expanded configuration into a collapsed storage configuration as required.

These and other objectives of the invention have been attained by a load retainer which when placed in the void of a cargo container is symmetrically loaded by the force generated by the tendency for the cargo to shift during transportation. As a result of the more even and uniform loading, a load retainer according to this invention can be expected to have a longer useful life than prior art void fillers or load retainers while providing an economic and effective device for securing the load within a partially filled cargo container. Further, the load retainer according to this invention can be easily transformed into a collapsed configuration for storage or transportation to another facility when not required for use as a load retainer.

In a presently preferred embodiment of the load retainer according to this invention, first and second spaced generally parallel panels are joined by a preferably collapsible hinge or spacer at each opposing side edge of the panel. In an expanded load retaining configuration, the device according to a presently preferred embodiment of this invention is generally H-shaped. The symmetrical H-shaped load retainer is juxtaposed to the load and positioned in the void between the load and the bulkhead of the partially filled cargo container. The front profile of the H-shaped cargo container is aligned between the load and bulkhead so that the force applied to the load retainer is evenly distributed on the H-shaped load retainer.

The hinge or spacer at opposing edges of the H-shaped load retainer forms a crossbar between the panels to give the load retainer the generally H-shaped configuration when in the expanded load retaining configuration. The hinges connected to the panels each include upper and lower flaps and a plurality of fold lines. When the load retainer is expanded into the H-shaped configuration, the upper and lower flaps are pivoted away from the edge of the load retainer inwardly to be generally perpendicular with respect to the hinge and each panel. In one presently preferred embodiment, the side edge of each flap is serrated to provide a friction lock as it engages an inner face of the adjacent panel. The flaps in the locked position inhibit the load retainer from collapsing during use. With the flaps folded inwardly as described, the load retainer is secured into the expanded symmetric H-shaped configuration for use in the cargo container.

The load retainer according to a presently preferred embodiment of the invention can be conveniently collapsed into a storage configuration by folding each of the flaps towards the adjacent edge of the respective panel so that they are generally planar with respect to the hinge. The collapsible hinge includes a longitudinal fold line which bisects the hinge and enables the hinge to be collapsed inwardly on itself to convert the load retainer to a storage configuration. Advantageously, the panels remain in a generally parallel relationship with each other in the expanded, collapsed, and all intermediate positions to thereby minimize the stress on any particular portion of the hinge which may result in a rip, tear or other failure as in prior art void fillers or load retainers.

In a presently preferred embodiment, each panel is constructed of an outer and an inner face sheet with reinforcing beams sandwiched therebetween. The entire load retainer is constructed of corrugated paperboard to provide an economical lightweight load retainer which has edge-on rigidity. Each reinforcing beam is constructed of layers of corrugated paperboard secured together.

In a second presently preferred embodiment of the load retainer, a pair of slotted transverse panels and a pair of slotted upright panels are coupled together to form a rectilinear network or tic-tac-toe shaped configuration. In this presently preferred embodiment, the transverse panels are perpendicular to the upright panels and are coupled together in the tic-tac-toe configuration by mating slots which are die cut from opposite edges of the respective panels.

An important feature of the second presently preferred embodiment is the provision of a locking tab positioned at an intersection at each transverse and upright panel. The locking tab advantageously secures the panels in the rectilinear or tic-tac-toe shaped configuration so that the load retainer resists collapse when a force is applied to it. In a presently preferred embodiment, the locking tab comprises a quarter circle slit originating at the intersection and terminating at a tab fold line. The tab is then pivoted so that it is generally perpendicular with both the transverse panel and the upright panel. A plurality of tab locks are provided on the tic-tac-toe shaped load retainer to secure the device in that configuration when a force is applied to either face of the load retainer when in use. The tabs advantageously inhibit transverse or lateral collapse of the tic-tac-toe shaped retainer. Further, the tabs can be pivoted to an unlocked position as required so that the load retainer can be collapsed by shifting the upper and lower portions of the load retainer in opposed side-wise directions.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
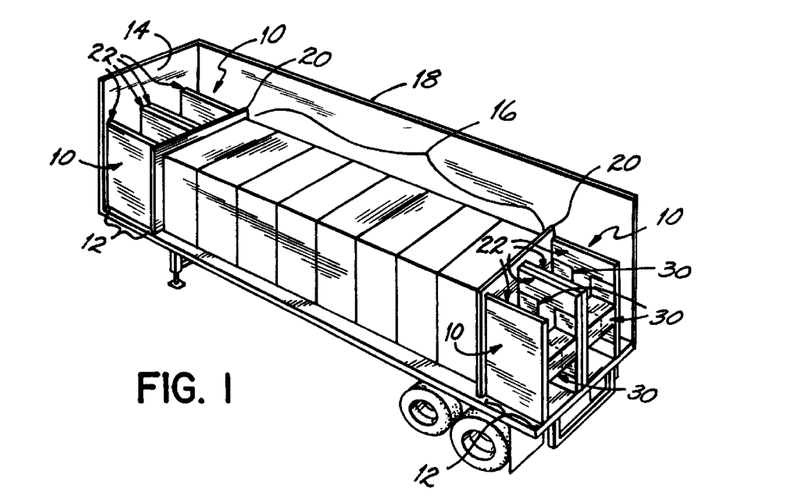
FIG. 1 is an exposed perspective view of a cargo container having a load and a first presently preferred embodiment of a load retainer which is positioned within a void of the cargo container according to a presently preferred embodiment of the invention.

Referring to FIG. 1, a load retainer 10 according to a first presently preferred embodiment is positioned within a void 12 between a bulkhead 14 and a load 16 of a cargo container 18. The cargo container 18 of FIG. 1 is shown as a truck; however, it will be appreciated that the present invention is useful as a load retainer in other cargo containers such as railroad box cars, cargo ship holds, or the like.

The load retainer 10 of FIG. 1 is juxtaposed to the load 16 and positioned within the void 12 between the bulkhead 14 and the load 16 in the cargo container 18. Preferably, a partition 20 is positioned between the load retainer 10 and the load 16 to isolate the load 16 from the load retainer 10 for protection and distribute the force on the load retainer 10 to prevent damage to the load 16 or the load retainer 10. The load retainer 10 is generally H-shaped in the first presently preferred embodiment of this invention and is aligned as shown in FIG. 1 so that a force generated by the tendency of the load 16 to shift is delivered to the edges of the load retainer 10.

Figure 2:
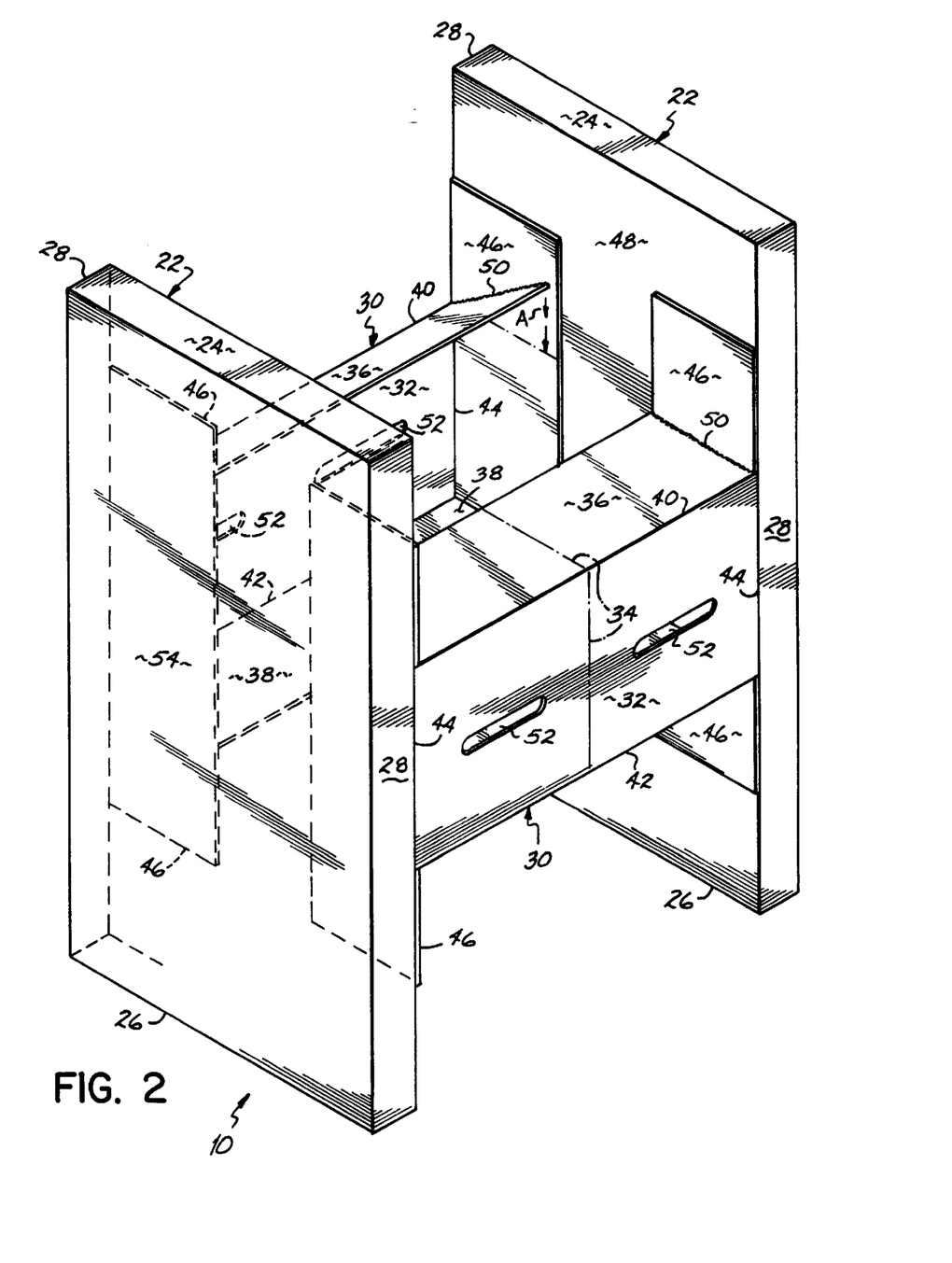
FIG. 2 is a perspective view of the first preferred embodiment of the invention in an expanded load retaining configuration.

Referring to FIG. 2, the first presently preferred embodiment of the load retainer 10 according to this invention is generally H-shaped in an expanded load retaining configuration. The load retainer 10 comprises first and second generally planar panels 22 each having a top edge 24 and a bottom edge 26 and spaced side edges 28. A preferably collapsible spacer or hinge 30 is attached proximate the corresponding side edges 28 of the panels 22 to produce the H-shaped configuration of the load retainer 10. In a presently preferred embodiment, the collapsible hinge 30 includes a hinge panel 32 extending between the panels 22. A longitudinal fold line 34 bisects the hinge panel 32. Upper and lower flaps 36, 38 are pivotally attached at upper and lower edges, respectively of the hinge panel 32. The upper and lower flaps 36, 38 are pivotal relative to the hinge panel 32 along upper and lower transverse fold lines 40, 42, respectively, which join the flaps 36, 38 to the hinge panel 32.

The hinge panel 32 is pivotally connected proximate the side edges 28 of the respective panels 22 by a side edge fold line 44 which joins the hinge panel 32 to a projection 46 which is facially adhered to an inner face 48 of the adjacent panel 22. An outer edge 50 of each flap 36, 38 adjacent the projection 46 and panel 22 is preferably serrated in order to provide an enhanced friction lock when the flap 36, 38 is pivoted in the direction of arrow A in FIG. 2 and away from the side edge 28 of the panel 22. The flaps 36, 38 lock the panels 22 in the H-shaped configuration when they are pivoted to be generally perpendicular with the hinge panel 32 so that the load retainer 10 will not collapse during use in response to an applied load. The hinge panel 32 preferably includes cutouts 52 which can be conveniently used as handholds to grasp and move the load retainer 10 in the expanded configuration.

Figure 3:
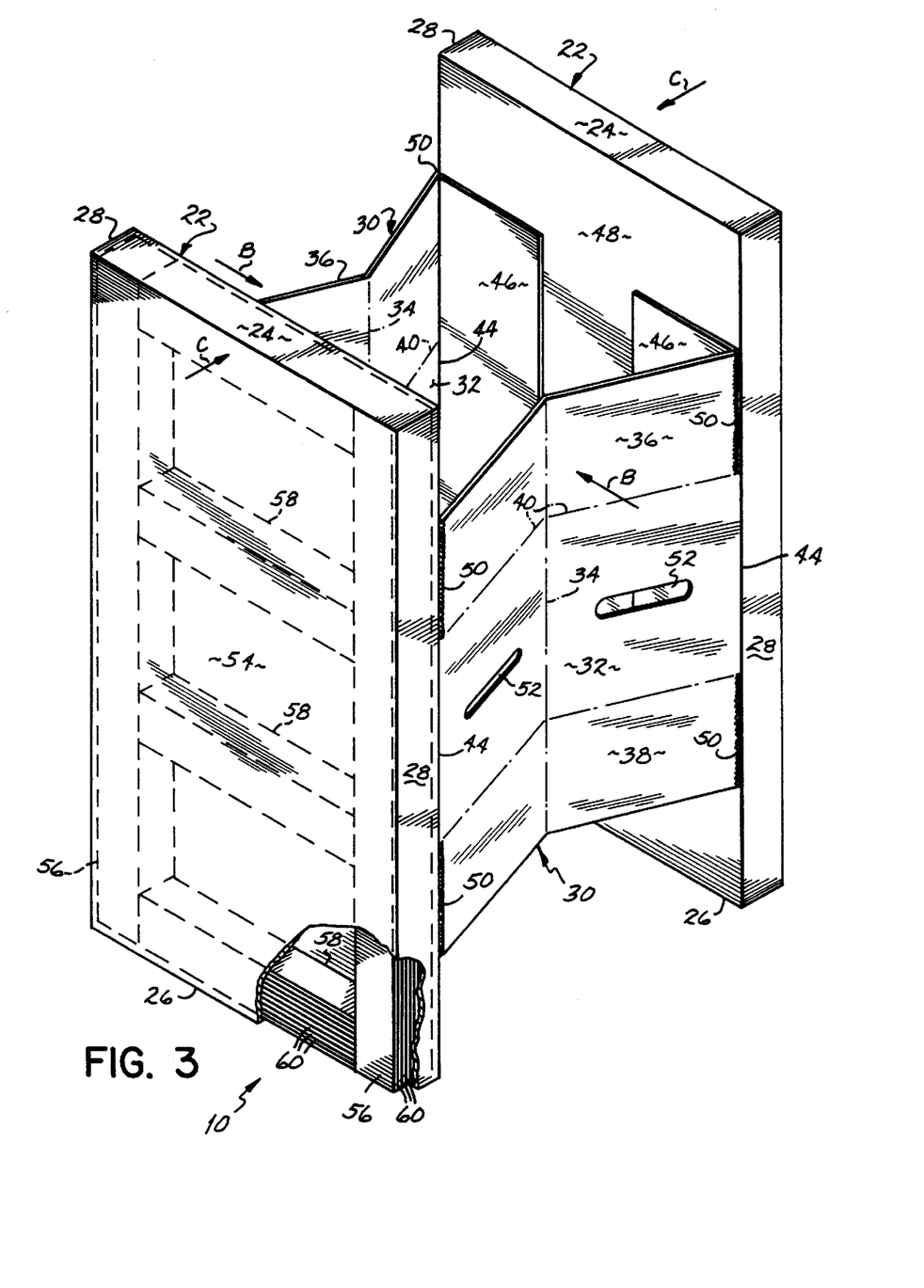
FIG. 3 is a view similar to FIG. 2 with the load retainer being converted into a collapsed storage configuration.
Figure 4:
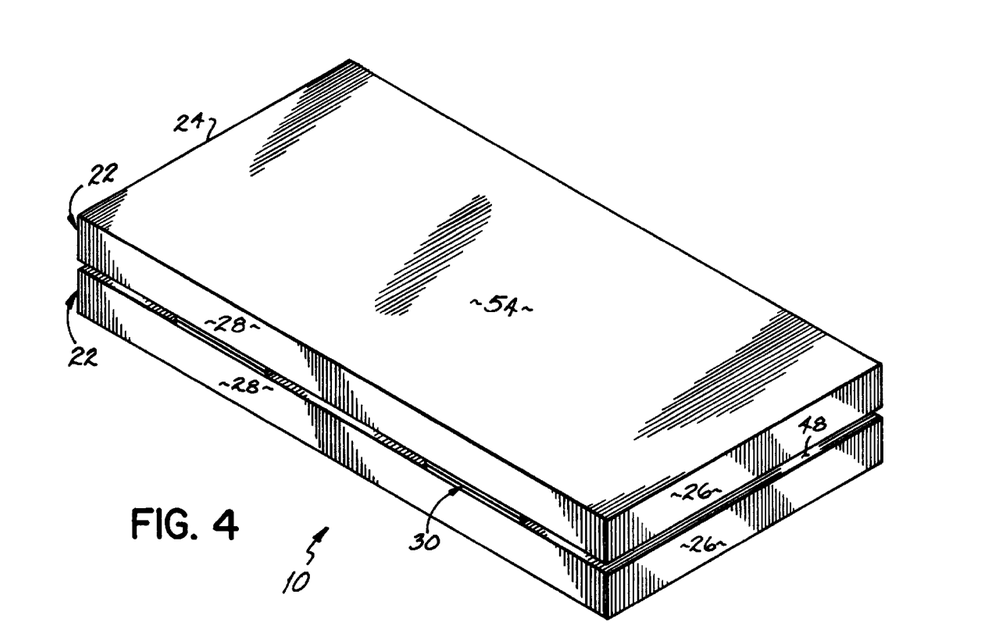
FIG. 4 is a perspective view of the first embodiment of the load retainer in the collapsed storage configuration.

In FIG. 3 the H-shaped load retainer 10 is being converted from the expanded load retaining configuration into a collapsed storage configuration which is shown in FIG. 4. In the storage configuration, the panels 22 remain generally parallel to each other and the hinge 30 is collapsed inwardly to a flat configuration and sandwiched between the panels 22. As shown in FIG. 3, the flaps 36, 38 are generally planar with respect to the respective portions of the hinge panel 32 with the upper and lower flaps 36, 38 pivoted upwardly and downwardly, respectively, toward the side edge 28 of the respective panels 22. In this configuration, the hinge panel 32 is folded about the longitudinal fold line 34 in the direction of arrow B to collapse the load retainer 10. The panels 22 are pulled inwardly in the direction of arrow C toward the collapsed storage configuration (FIG. 4) as the hinges are folded about the longitudinal fold lines. The panels 22 advantageously remain parallel to each other in the expanded configuration (FIG. 2), the collapsed configuration (FIG. 4), and all configurations therebetween (FIG. 3).

Each panel 22 of the load retainer 10 according to the first presently preferred embodiment of this invention includes an outer face sheet 54 and the inner face sheet 48. Preferably, the face sheets 48, 54 are formed by a single piece of corrugated paperboard which is wrapped around the side edges 28 of the panel 22 as shown in FIG. 3. A plurality of reinforcing beams are sandwiched between the inner and outer face sheets 48, 54 of each panel 22. Preferably, a longitudinal reinforcing beam 56 is proximate each side edge 28 of each panel 22 and a plurality of spaced horizontal reinforcing beams 58 extend between the spaced longitudinal reinforcing beams 56. Each reinforcing beam 56, 58 is constructed of a plurality of layers of corrugated paperboard 60 with each layer 60 preferably facially adhered to the adjacent layer 60 to provide added strength and structural rigidity to the assembly. Advantageously, recycled corrugated paperboard can be used in the construction of the reinforcing beams 56, 58 and the other components of the load retainer 10.

In presently preferred embodiments of the H-shaped load retainer 10 according to this invention, the panels 22 range from 34–60 inches in width and 48–72 inches in height. In the expanded configuration, the outer face sheets 54 of the panels 22 are spaced 36–46 inches apart. Each panel 22 is approximately 1½ inches thick so that the load retainer 10 in the closed position is approximately 3–3½ inches thick. Preferably, the entire load retainer 10 including panels 22, face sheets 48, 54, reinforcing beams 56, 58 and hinge 30 components are constructed from corrugated paperboard. Further, 200# AC flute corrugated paperboard is preferably used.

Figure 5:
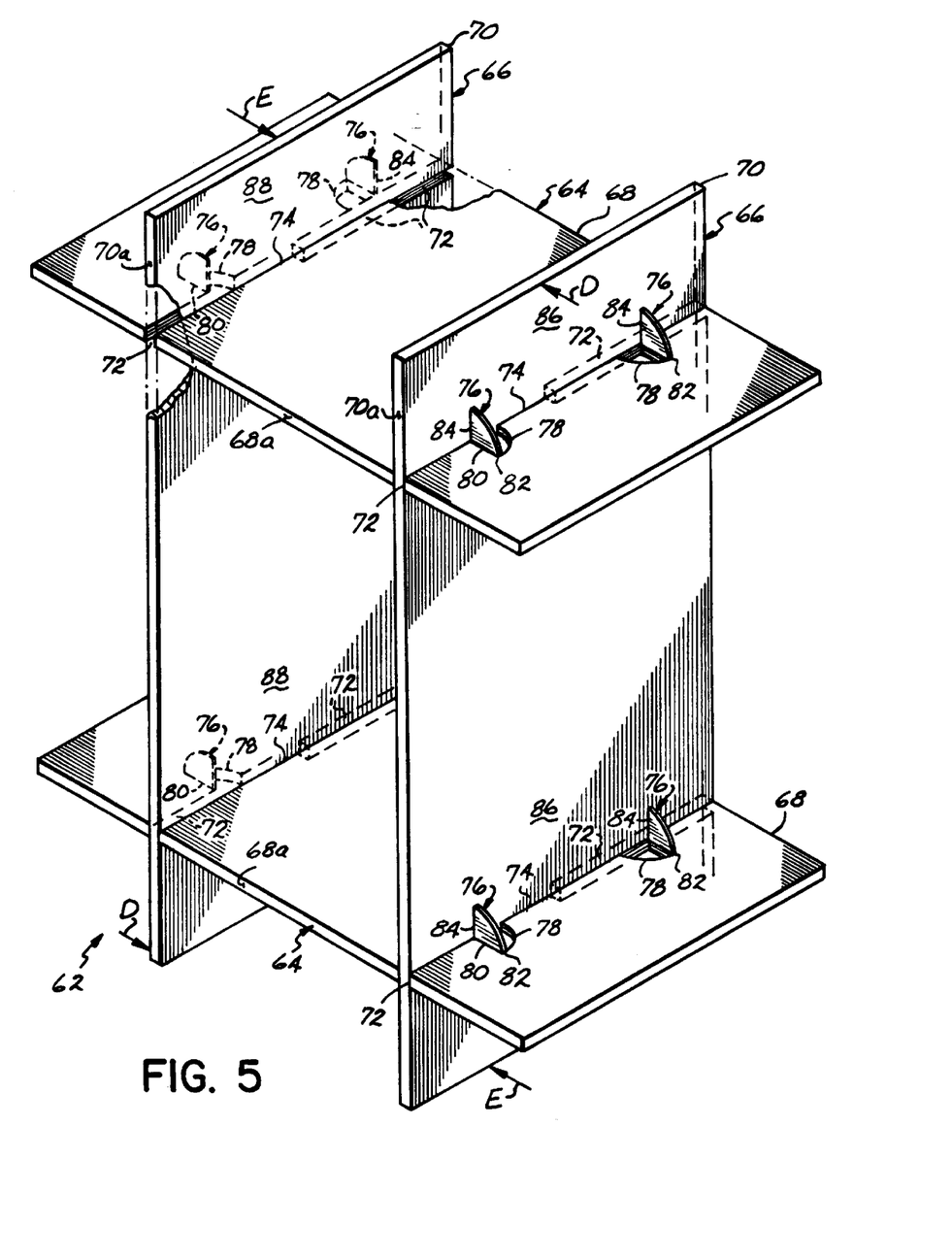
FIG. 5 is a perspective view of a second presently preferred embodiment of the load retainer according to this invention.

A second presently preferred embodiment of a load retainer 62 according to this invention is shown in FIG. 5. This load retainer 62 can be positioned in the void 12 of a cargo container 18 similar to that of FIG. 1 with respect to the first embodiment. The load retainer 62 comprises a pair of generally planar and rectangular transverse panels 64 and a pair of generally planar rectangular upright panels 66. The transverse panels 64 are spaced one from another as are the upright panels 66. The upright panels 66 serve as a spacer for the transverse panels 64 and vice versa. In a presently preferred embodiment, the upright panels 66 are generally perpendicular to the transverse panels 64 and the panels 64, 66 are coupled together to form a rectilinear network or a tic-tac-toe shaped configuration. Each transverse panel 64 has opposed side edges 68 and each upright panel 66 has opposed side edges 70. The panels 64, 66 are coupled together in a presently preferred embodiment by mating slots 72 in each of the panels 64, 66. The slots 72 extend inwardly from the respective side edges of the panels 64, 66 at each intersection 74 of each transverse and upright panel 64, 66. Specifically, the slot 72 in the transverse panel 64 extends inwardly from a first side edge 68a and the slot 72 of the intersecting upright panel 66 extends inwardly from an opposite side edge 70a. Each intersection 74 of the transverse and upright panels 64, 66 has similarly configured and mating slots 72.

Locking tabs 76 are provided proximate the intersection 74 of the transverse and upright panels 64, 66 in order to releasably secure the panels 64, 66 in the rectilinear network shaped configuration as shown in FIG. 5 of a presently preferred embodiment. The locking tabs 76 are shown in FIG. 5 in the transverse panels 64 but could readily be formed in the upright panels 66 or in both the transverse and upright panels 64, 66 according to this invention. For clarity, the following description of the tabs 76 will be in reference to the tabs 76 in the transverse panels 64, but is readily applicable to tabs 76 in the upright panels 66. Each locking tab 76 is formed by a 90° arcuate slit 78 and a tab fold line 80 extending from a terminal point 82 of the arcuate slit 78 toward the intersection 74. The locking tab 76 is folded so that it is generally perpendicular with both the transverse and upright panels 64, 66 and an outer edge 84 of the locking tab 76 engages the upright panel 66. As a result, the locking tab 76 maintains the panels 64, 66 in the tic-tac-toe shaped configuration or rectilinear network and resists lateral shifting or movement of the panels 64, 66 relative to each other.

Preferably, the locking tabs 76 in each transverse panel 64 are on outer faces 86 of the respective upright panels 66 to resist forces in either lateral direction. Alternatively, the locking tabs 76 of each transverse panel 64 could be positioned on an inner face 88 of the upright panels 66 to likewise resist lateral forces in either direction. However, the locking tabs 76 of one transverse panel 64 should not be only on one inner face 88 and one outer face 86 of the intersecting upright panels 66 because only lateral forces in one direction would be resisted in this arrangement.

If required, the load retainer 62 may be collapsed to a generally flat configuration by pivoting the locking tabs 76 to be co-planar with the panel 64 or 66 in which they are formed. The load retainer 62 is then collapsed by applying opposed lateral forces as shown by arrows D or E of FIG. 5 to the top and bottom portions of the load retainer 62. Each transverse panel 64 and each upright panel 66 remains generally parallel with respect to the complementary transverse panel 64 and upright panel 66, respectively, in the expanded rectilinear network configuration, collapsed configuration and all positions therebetween.

In a presently preferred embodiment of the load retainer 62, each panel 64, 66 is approximately 1½ inches thick and comprises multiple layers of 200# AC flute corrugated paperboard. Each transverse panel 64 measures 25–84 inches by 42–48 inches. Each upright panel 66 measures 25–84 inches by 48–76 inches thereby providing a tic-tac-toe shaped load retainer 62 having overall outer dimensions of 25–84 inches wide, 48–76 inches high and 42–48 inches deep.

From the above disclosure of the general principles of the present invention and the preceding detailed description of a preferred embodiment, those skilled in the art will readily comprehend the various modifications to which this invention is susceptible. Therefore, we desire to be limited only by the scope of the following claims and equivalents thereof.

We claim:

1. A combination comprising:

a cargo container;

a load within said cargo container creating a void therein;

a load retainer in said void within said cargo container, said load retainer further comprising:

a first and second panel, each said panel having a first side edge and a second spaced side edge, each said panel further having edge-on strength and rigidity to resist a force applied by said load to one of said side edges of each said panel when the load retainer is juxtaposed to the load in said void in said cargo container;

said panels to be convertable to and between an expanded, load retaining configuration and a collapsed, storage configuration;

a spacer connecting said first and second panels together, said spacer maintaining said panels in said expanded, load retaining configuration in which said panels are spaced from each other;

said spacer further comprising:

a hinge pivotally connected to each said panel proximate each said first side edge, intermediate top and bottom edges of each said panel;

a longitudinal fold line on said hinge; and a flap pivotally connected to said hinge by a transverse fold line said transverse fold line being generally perpendicular to said longitudinal fold line said flap including a longitudinal fold line adjoined with said longitudinal fold line on said hinge;

said flap being pivotable inwardly and away from said first side edge of each said panel, to releasably lock each said panel in said expanded, load retaining configuration; and said flap being pivotable to be generally co-planar with said hinge and being foldable along said longitudinal fold line of said flap when said panels are transformed into said collapsed configuration.

2. The combination of claim 1 wherein said spacer further enables said panels to be converted to and between said expanded load retaining configuration and said collapsed, storage configuration, while maintaining said panels generally parallel with respect to each other in said expanded configuration and said collapsed configuration and all positions intermediate said expanded and collapsed configurations.

3. The combination of claim 1 further comprising:

a hand hold in said spacer by which the load retainer can be grasped and repositioned.

4. The combination of claim 1 wherein each said panel comprises:

an inner and an outer face sheet; and a plurality of reinforcing beams interposed between said inner and outer face sheets.

5. The combination of claim 1 further comprising:

a lock releasably securing said panels in said expanded configuration.

6. A load retainer for use in a void of a cargo container comprising:

a first and second generally planar panel, each said planar panel having first and second spaced side edges each said planar panel having an inner and an outer face sheet and a plurality of reinforcing beams interposed between said inner and outer face sheets, each said planar panel further having edge-on strength and rigidity to resist a force applied by a load to one of said side edges of each said planar panel when the load retainer is juxtaposed to the load in the void of the cargo container;

a hinge connecting said first and second planar panels together, said hinge maintaining said planar panels generally parallel to each other in both an expanded, load retaining configuration in which said planar panels are spaced from each other and a collapsed, storage configuration: said a hinge panel pivotally connected to each said planar panel proximate each said first side edge, intermediate top and bottom edges of each said planar panel;

a longitudinal fold line on said hinge panel, said longitudinal fold line bisecting said hinge panel and extending generally parallel to each said planar panel; and an upper and a lower flap pivotally connected to said hinge panel by an upper and a lower transverse fold line, respectively, said upper and lower transverse fold lines being generally parallel with each other and generally perpendicular to said longitudinal fold line, an edge of each said flap proximate respective said planar panels being serrated;

wherein when said upper and lower flaps are pivoted inwardly and away from said first side edge of said respective planar panel, said serrated edges engage said respective planar panel to thereby releasably lock said planar panels in said expanded configuration;

wherein when said upper and lower flaps are pivoted to be generally coplanar with said hinge panel and said hinge folded along said longitudinal fold line, said planar panels are transformed into said collapsed configuration.

7. The combination of claim 6 further comprising:

a hand hold in said hinge by which the load retainer can be grasped and repositioned.

8. The combination of claim 3 wherein said panels, said face sheets, said beams and said hinge are each fabricated from corrugated paper board.

9. A load retainer for use in a void of a cargo container comprising:

a first and second generally planar panel, each said planar panel having a top and a bottom edge and first and second spaced side edges, each said planar panel having an inner and an outer face sheet and a plurality of reinforcing beams interposed between said inner and outer face sheets, each said planar panel further having edge-on strength and rigidity to resist a force applied by a load to one of said side edges of each said planar panel when the load retainer is juxtaposed in the void of the cargo container;

a collapsible hinge connecting said first and second planar panels together, said hinge maintaining said planar panels generally parallel to each other in both an expanded, load retaining configuration in which said planar panels are spaced from each other and a collapsed, storage configuration, said hinge further comprising:

a hinge panel pivotally connected to each said planar panel proximate each said first side edge, intermediate said top and bottom edges;

a longitudinal fold line on said hinge panel, said longitudinal fold line bisecting said hinge panel and extending generally parallel to each said planar panel; and an upper and a lower flap pivotally connected to said hinge panel by an upper and a lower transverse fold line, respectively, said upper and lower transverse fold lines being generally parallel with each other and generally perpendicular to said longitudinal fold line, an edge of each said flap proximate respective said planar panels being serrated;

wherein when said upper and lower flaps are pivoted inwardly and away from said first side edge of said respective planar panel, said serrated edges engage said respective planar panel to thereby releasably lock said planar panels in said expanded configuration;

wherein when said upper and lower flaps are pivoted to be generally coplanar with said hinge panel and said hinge collapsed and folded along said longitudinal fold line, said planar panels are transformed into said collapsed configuration; and a hand hold in said hinge panel by which the load retainer can be grasped and repositioned;

wherein said planar panels, said face sheets, said beams and said hinge are each fabricated from corrugated paper board.

\* \* \* \* \*

UNITED STATES PATENT AND TRADEMARK OFFICE
CERTIFICATE OF CORRECTION

PATENT NO. : 5,855,459
DATED     : January 5, 1999
INVENTOR(S) : Martin Krier and John Perazzo It is certified that error appears in the above-indentified patent and that said Letters Patent is hereby corrected as shown below:

At column 8, line 3, please delete the word "said".

At column 8, line 32, please delete the number "3" and insert the number --6--.

Signed and Sealed this

Fifteenth Day of June, 1999

Attest:

Q. TODD DICKINSON

*Attesting Officer*   *Acting Commissioner of Patents and Trademarks*